(12) United States Patent
Han et al.

(10) Patent No.: US 7,691,509 B2
(45) Date of Patent: Apr. 6, 2010

(54) REFORMER AND FUEL CELL SYSTEM HAVING THE SAME

(75) Inventors: Ji-Seong Han, Suwon-si (KR); Ho-Jin Kweon, Suwon-si (KR); Ju-Yong Kim, Suwon-si (KR); Zin Park, Suwon-si (KR); Hyun-Jeong Lim, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 946 days.

(21) Appl. No.: 11/159,846

(22) Filed: Jun. 22, 2005

(65) Prior Publication Data

US 2006/0003202 A1    Jan. 5, 2006

(30) Foreign Application Priority Data

Jun. 23, 2004   (KR)   ...................... 10-2004-0047023

(51) Int. Cl.
*H01M 8/06* (2006.01)
*B01J 8/02* (2006.01)

(52) U.S. Cl. ............................. 429/19; 48/61; 422/211

(58) Field of Classification Search ......... 422/188–197, 422/211, 212; 429/12–46
See application file for complete search history.

(56) References Cited

U.S. PATENT DOCUMENTS

| | | | |
|---|---|---|---|
| 7,189,371 B2 | 3/2007 | Iwasaki | |
| 2002/0071797 A1 | 6/2002 | Loffler et al. | |
| 2002/0106596 A1* | 8/2002 | Hermann et al. | ............... 431/12 |
| 2004/0018129 A1* | 1/2004 | Kawamura et al. | ........... 422/211 |
| 2004/0025784 A1* | 2/2004 | Kawamura et al. | ........... 117/200 |
| 2007/0280862 A1* | 12/2007 | Davis et al. | ................. 422/141 |

FOREIGN PATENT DOCUMENTS

| | | |
|---|---|---|
| CN | 1503692 A | 6/2004 |
| CN | 1383417 A | 12/2004 |
| JP | 2-80301 | 3/1990 |
| JP | 6-111838 | 4/1994 |
| JP | 07-176314 | 7/1995 |
| JP | 8-283002 | 10/1996 |
| JP | 2004-107175 | 4/2004 |
| WO | WO 02/087744 A1 | 11/2002 |

OTHER PUBLICATIONS

Patent Abstracts of Japan, Publication No. 02-080301; Publication Date: Mar. 20, 1990; in the name of Hiroshi Yoshioka et al.
Patent Abstracts of Japan, Publication No. 06-111838; Publication Date: Apr. 22, 1994; in the name of Tomiaki Furuya et al.

* cited by examiner

*Primary Examiner*—Jennifer K Michener
*Assistant Examiner*—Imran Akram
(74) *Attorney, Agent, or Firm*—Christie, Parker & Hale, LLP

(57) ABSTRACT

A fuel cell system including: a reformer for generating hydrogen from a fuel containing hydrogen; at least one electricity generator for generating electric energy through an electrochemical reaction between hydrogen and oxygen; a fuel supply unit for supplying the fuel to the reformer; and an oxygen supply unit for supplying oxygen to the reformer and the electricity generator. Here, the reformer includes a plurality of plates stacked to form at least one passage for allowing a material selected from the group consisting of the fuel and a gas to flow therethrough, and at least one catalyst layer formed on entire surfaces of the at least one passage.

18 Claims, 9 Drawing Sheets

REFORMER AND FUEL CELL SYSTEM HAVING THE SAME

CROSS-REFERENCE TO RELATED APPLICATION

This application claims priority to and the benefit of Korean Patent Application 10-2004-0047023 filed in the Korean Intellectual Property Office on Jun. 23, 2004, the entire content of which is incorporated herein by reference.

FIELD OF THE INVENTION

The present invention relates to a fuel cell system and more particularly to a plate type reformer for a fuel cell system.

BACKGROUND OF THE INVENTION

As is well known, a fuel cell is an electricity generating system that directly converts chemical reaction energy of oxygen and hydrogen contained in hydrocarbon materials such as methanol, ethanol, or natural gas into electric energy.

A polymer electrolyte membrane fuel cell (hereinafter, referred to as PEMFC) has been developed recently which has excellent output characteristics, low operating temperatures, and fast starting and response characteristics. PEMFCs have a wide range of application, including mobile power sources for vehicles, distributed power sources for homes or buildings, and small-size power sources for electronic apparatuses.

A fuel cell system employing the PEMFC scheme includes a stack, a reformer, a fuel tank, and a fuel pump. The stack includes an electricity generator and has a plurality of unit cells and the fuel pump supplies a fuel stored in the fuel tank to the reformer. Then, the reformer reforms the fuel to generate hydrogen and supplies hydrogen to the stack, which generates electric energy through an electrochemical reaction between the hydrogen and oxygen.

The reformer is a device for generating hydrogen from the fuel containing hydrogen through a catalytic chemical reaction using thermal energy. Generally, the reformer includes a heat source for generating the thermal energy, a reforming reactor for generating the hydrogen gas from the fuel using the thermal energy, and a carbon-monoxide remover for reducing the concentration of carbon monoxide contained in the hydrogen gas.

In a conventional reformer of a fuel cell system, the heat source, the reforming reactor, and the carbon-monoxide remover are each formed in a vessel shape and are connected and separated through pipes. Accordingly, it is difficult to compactly embody the fuel cell system and to rapidly deliver the thermal energy generated from the heat source to the reforming reactor, thereby deteriorating reaction efficiency and thermal efficiency of the entire fuel cell system.

SUMMARY OF THE INVENTION

An embodiment of the present invention provides a reformer which can enhance reaction efficiency and thermal efficiency with a simple structure. According to another embodiment, a fuel cell system is provided having the reformer.

One embodiment of the present invention provides a fuel cell system. The fuel cell system includes: a reformer for generating hydrogen from a fuel containing hydrogen; at least one electricity generator for generating electric energy through an electrochemical reaction between hydrogen and oxygen; a fuel supply unit for supplying the fuel to the reformer; and an oxygen supply unit for supplying oxygen to the reformer and the electricity generator. The reformer includes a plurality of plates stacked to form at least one passage for allowing a material selected from the group consisting of the fuel and a gas to flow therethrough and at least one catalyst layer formed on entire surfaces of the at least one passage. Here, the gas includes air, oxygen gas, hydrogen gas and so on.

Here, at least one channel may be formed on at least one surface of at least one of the plurality of plates, and a different one of the plurality of plates is contacted with the at least one surface in which the at least one channel is formed to thereby form the at least passage.

The at least one catalyst layer may be formed on entire inner surfaces of the at least one channel and on a surface portion of the different one of the plurality of plates contacting the at least one surface of the at least one of the plurality of plates in which the at least one channel is formed and wherein the surface portion of the different one of the plurality of plates corresponds to the at least one channel. Alternatively, the at least one catalyst layer may be formed on entire inner surfaces of the at least one channel and on a surface of the different one of the plurality of plates contacting the at least one surface of the at least one of the plurality of plates in which the at least one channel is formed.

The reformer may have a heat source for generating thermal energy and a reforming reactor, stacked with the heat source, for generating hydrogen from the fuel.

The plurality of plates may include: a first reaction plate having a first channel; a second reaction plate contacting one surface of the first reaction plate and having a second channel; and a cover plate contacting one surface of the second reaction plate. Here, the at least one catalyst layer comprises a plurality of catalyst layers and the catalyst layers may include: an oxidation catalyst layer formed on entire surfaces of one of the passages formed by the first channel and the second reaction plate; and a reforming catalyst layer formed on entire surfaces of another one of the passages formed by the second channel and the cover plate.

The reformer may have a heat source for generating thermal energy, a reforming reactor for generating hydrogen gas from the fuel, and at least one carbon-monoxide reducer for reducing a concentration of carbon monoxide contained in the hydrogen gas, and wherein the reformer, the reforming reactor and the at least one carbon-monoxide reducer are stacked with each other.

The plurality of plates may include: a first reaction plate having a first channel; a second reaction plate contacting one surface of the first reaction plate and having a second channel; a third reaction plate contacting one surface of the second reaction plate and having a third channel; and a cover plate contacting one surface of the third reaction plate. Here, the catalyst layers may include: an oxidation catalyst layer formed on entire surfaces of a first one of the passages formed by the first channel and the second reaction plate; a reforming catalyst layer formed on entire surfaces of a second one of the passages formed by the second channel and the third reaction plate; and a water-gas shift catalyst layer formed on entire surfaces of a third one of the passages formed by the third channel and the cover plate.

The plurality of plates may include: a first reaction plate having a first channel; a second reaction plate contacting one surface of the first reaction plate and having a second channel; a third reaction plate contacting another surface of the first reaction plate and having a third channel; and a cover plate contacting another surface of the second reaction plate. Here, the catalyst layers may include: an oxidation catalyst layer formed on entire surfaces of a first one of the passages formed by the first channel and the second reaction plate; a reforming catalyst layer formed on entire surfaces of a second one of the passages formed by the second channel and the cover plate; and a preferential CO oxidation catalyst layer formed on the entire surfaces of a third one of the passages formed by the third channel and the first reaction plate.

The plurality of plates may include: a first reaction plate having a first channel; a second reaction plate contacting one surface of the first reaction plate and having a second channel; a third reaction plate contacting one surface of the second reaction plate and having a third channel; a fourth reaction plate contacting another surface of the first reaction plate and having a fourth channel; and a cover plate contacting one surface of the third reaction plate. Here, the catalyst layers may include: an oxidation catalyst layer formed on entire surfaces of a first one of the passages formed by the first channel and the second reaction plate; a reforming catalyst layer formed on entire surfaces of a second one of the passages formed by the second channel and the third reaction plate; a water-gas shift catalyst layer formed on entire surfaces of a third one of the passages formed by the third channel and the cover plate; and a preferential CO oxidation catalyst layer formed on entire surfaces of a fourth one of the passages formed by the fourth channel and the first reaction plate.

The fuel supply unit may include: a fuel tank for storing the hydrogen-containing fuel, and a fuel pump connected to the fuel tank.

The oxygen supply unit may include an air pump for pumping air.

The fuel cell system may employ a polymer electrolyte membrane fuel cell (PEMFC) scheme.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Hereinafter, exemplary embodiments of the present invention will be described in detail with reference to the attached drawings, such that the present invention can be easily put into practice by those skilled in the art. However, the present invention is not limited to the exemplary embodiments, and may be embodied in various forms.

Figure 1:
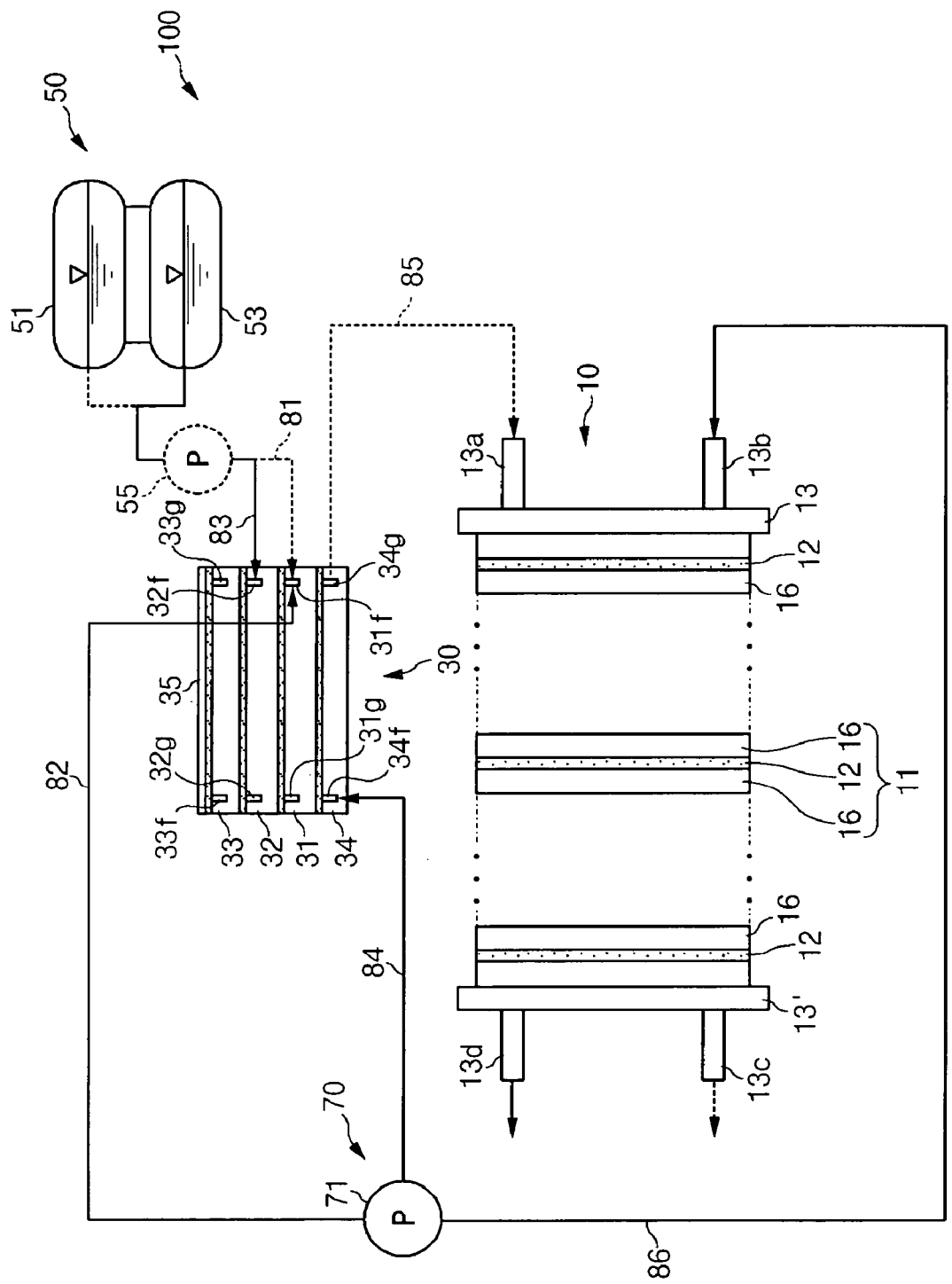
FIG. 1 is a schematic diagram illustrating an entire construction of a fuel cell system according to an embodiment of the present invention.

FIG. 1 is a schematic diagram illustrating an entire construction of a fuel cell system according to an embodiment of the present invention.

The fuel used to generate electricity in the fuel cell system 100 according to the present invention can include a liquid or gas hydrogen-containing fuel such as methanol, ethanol, or natural gas. However, liquid fuel is exemplified in the following description.

The fuel cell system 100 may utilize pure oxygen stored in an additional storage device for reacting with hydrogen contained in the fuel or may utilize oxygen-containing air as the necessary oxygen source. However, the latter is exemplified in the following description.

Referring to FIG. 1, the fuel cell system 100 includes a reformer 30 for generating hydrogen from the fuel, a stack 10 for generating electric energy through an electrochemical reaction between hydrogen and oxygen contained in the air, a fuel supply unit 50 for supplying the fuel to the reformer 30, and an oxygen supply unit 70 for supplying oxygen to the stack 10 and the reformer 30.

The fuel cell system 100 according to the present embodiment employs a polymer electrolyte membrane fuel cell (PEMFC) scheme in which the reformer 30 generates hydrogen and supplies hydrogen to the stack 10, and the stack 10 generates electric energy through the electrochemical reaction between hydrogen and oxygen.

The fuel supply unit 50 includes a first tank 51 for storing the fuel, a second tank 53 for storing water, and a fuel pump 55 connected to the first and second tanks 51 and 53. The oxygen supply unit 70 includes an air pump 71 for pumping air with a predetermined pumping power.

A structure of the reformer 30 generating hydrogen from the hydrogen-containing fuel will be first described with reference to FIGS. 1, 2, and 3, and then a structure of the stack 10 for generating electric energy through the electrochemical reaction between hydrogen and oxygen will be described with reference to FIGS. 1 and 4.

Figure 2:
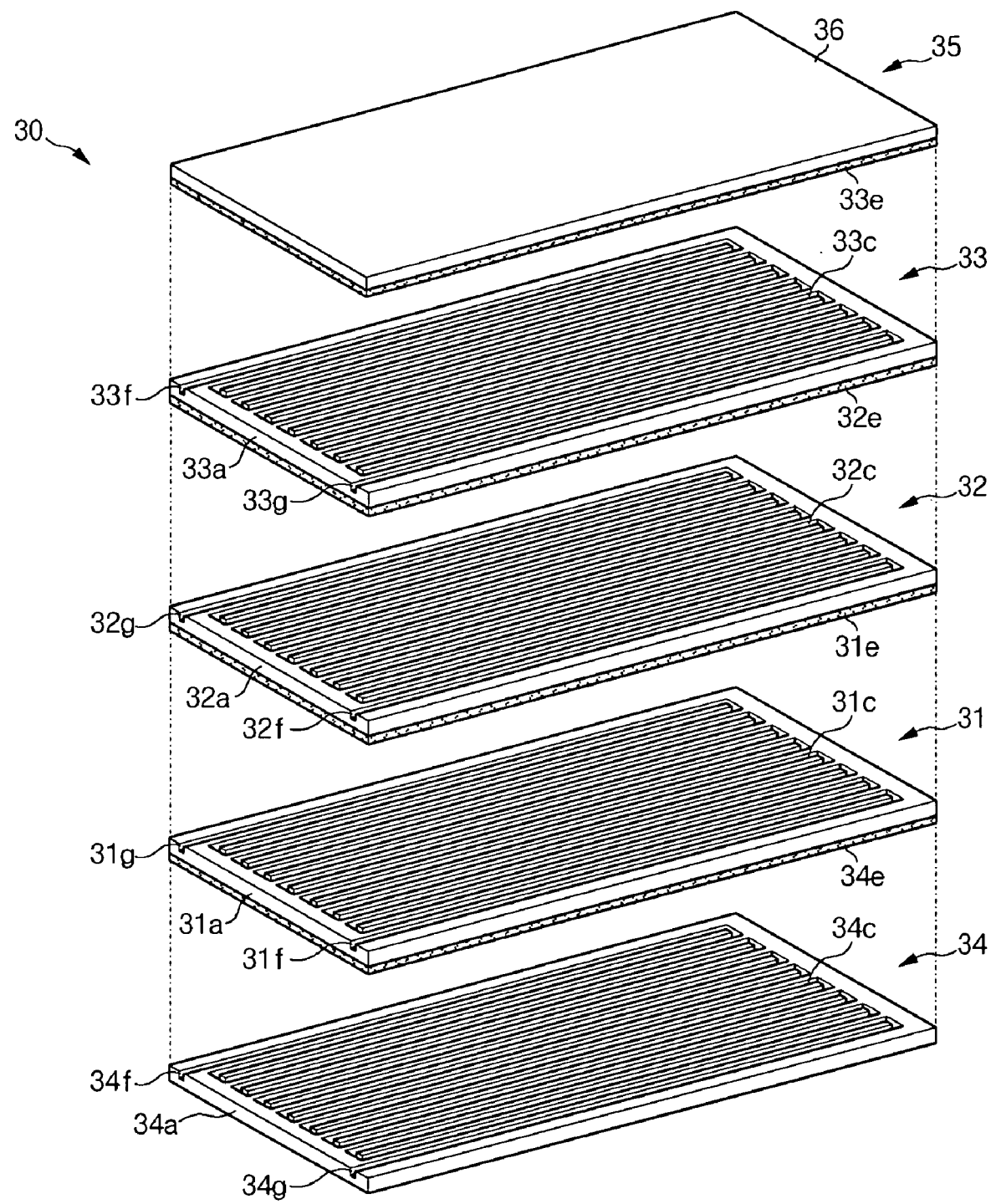
FIG. 2 is an exploded perspective view illustrating a structure of a reformer shown in FIG. 1.
Figure 3:
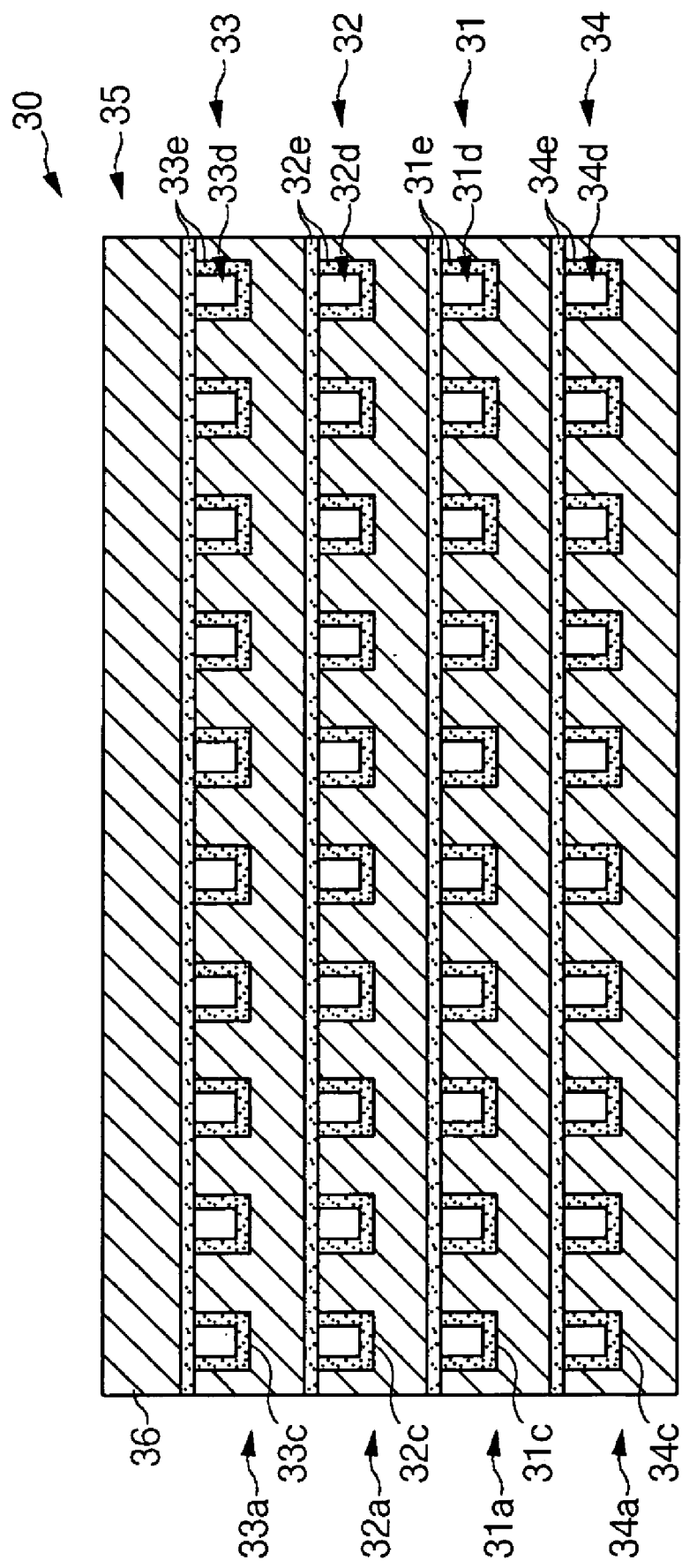
FIG. 3 is a cross-sectional view illustrating the coupled structure of the reformer shown in FIG. 2.

FIG. 2 is an exploded perspective view illustrating the structure of the reformer 30 shown in FIG. 1, and FIG. 3 is a cross-sectional view illustrating the coupled structure of the reformer 30 shown in FIG. 2.

The reformer 30 according to the present invention reforms the fuel through a catalytic chemical reaction using thermal energy from a reaction such as a steam reforming reaction, a partial oxidation reaction, or an auto-thermal reaction to generate hydrogen gas, and reduces the concentration of carbon monoxide contained in the hydrogen gas by using a catalytic reaction such as a water-gas shift reaction or a preferential CO oxidation reaction or a purification process such as with a separating membrane.

The reformer 30 according to the present embodiment includes a heat source 31, a reforming reactor 32, and first and second carbon-monoxide reducers 33 and 34. The heat source 31 generates the thermal energy necessary for the catalytic chemical reaction, the reforming reactor 32 absorbs the thermal energy generated from the heat source 31, vaporizes the fuel, and generates the hydrogen gas. Also, the first carbon-monoxide reducer 33 generates additional hydrogen gas to reduce the concentration of carbon monoxide contained in the hydrogen gas through a water-gas shift reaction (WGS). The second carbon-monoxide reducer 34 reduces the concentration of carbon monoxide contained in the hydrogen gas through a preferential CO oxidation (PROX) catalytic reaction of air and the hydrogen gas discharged from the first carbon-monoxide reducer 33. In one embodiment of the reformer 30, the first carbon-monoxide reducer 33 is the primary reducer of the concentration of the carbon monoxide, and the second carbon-monoxide reducer 34 is the secondary reducer of the concentration of the carbon monoxide.

The reformer 30 may further include a vaporization section (not shown), which vaporizes the fuel using the thermal energy generated from the heat source 31, between the heat source 31 and the reforming reactor 32.

According to the present embodiment, the reformer 30 includes a plurality of plate-shaped sections including the heat source 31, the reforming reactor 32, the first carbon-monoxide reducer 33, the second carbon-monoxide reducer 34, and a cover 35, stacked adjacent one another. The heat source 31, the reforming reactor 32, the first carbon-monoxide reducer 33, and the second carbon-monoxide reducer 34 respectively have catalyst layers 31e, 32e, 33e, and 34e formed on the entire inner surfaces of passages 31d, 32d, 33d, and 34d for allowing the fuel, the air, and the hydrogen gas to flow. The respective reaction sections 31, 32, 33, and 34 will be described in more detail by explaining the structures of plural reaction plates 31a, 32a, 33a, 34a, and cover plate 36, and then explaining the catalyst layers 31e, 32e, 33e, and 34e formed thereon.

A first channel 31c for enabling flow of the fuel and the air is formed on one surface of the first reaction plate 31a. An inlet 31f, into which the combusted gas of the liquid fuel and the air flows, is formed at one or a start end of the first channel 31c; and an outlet 31g, from which the combusted gas of the liquid fuel and the air flows, is formed at another or a finish end of the first channel 31c. The inlet 31f and the first tank 51 can be connected through a first supply line 81, and the inlet 31f and the air pump 71 can be connected through a second supply line 82.

A second channel 32c for enabling flow of the fuel and the air is formed on a top surface of the second reaction plate 32a. An inlet 32f, into which a mixture of the fuel and water from the first and second tanks 51 and 53 (hereinafter, referred to as a fuel mixture) flows, is formed at a start end of the second channel 32c; and an outlet 32g, from which the hydrogen gas generated from the fuel mixture flows, is formed at a finish end of the second channel 32c. The inlet 32f and the first and second tanks 51 and 53 can be connected through a third supply line 83. The inlet 32f can be connected to the outlet 31g of the first reaction plate 31a through an additional pipe (not shown).

A third channel 33c for enabling the flow of the hydrogen gas generated from the reforming reactor 32 is formed on a top surface of the third reaction plate 33a. An inlet 33f, into which the hydrogen gas flows, is formed at a start end of the third channel 33c; and an outlet 33g, from which the hydrogen gas of which the concentration of carbon monoxide that has been primarily reduced flows, is formed at a finish end of the third channel 33c. The inlet 33f can be connected to the outlet 32g of the second reaction plate 32a through an additional connection mechanism (not shown), such as a pipe or a penetrated hole.

A fourth channel 34c for enabling the flow of the hydrogen gas is formed on a top surface of the fourth reaction plate 34a. An inlet 34f, into which the hydrogen gas flows, is formed at a start end of the fourth channel 34c; and an outlet 34g, from which the hydrogen gas of which the concentration of carbon monoxide that has been secondarily reduced flows, is formed at a finish end at the fourth channel 34c. The inlet 34f and the air pump 71 can be connected through a fourth supply line 84 and the inlet 34f can be connected to the outlet 33g of the third reaction plate 33a through an additional connection mechanism (not shown), such as a pipe or a penetrated hole. The outlet 34g and the stack 10 described later can be connected through a fifth supply line 85.

The respective channels 31c, 32c, 33c, and 34c are formed on the respective reaction plates 31a, 32a, 33a, and 34a to have parallel straight flow lines with a predetermined gap between adjacent flow lines on the top surfaces of the respective reaction plates 31a, 32a, 33a, 34a. The adjacent flow lines of each of the respective channels 31c, 32c, 33c, and 34c are connected at the ends such that the flow lines together define a serpentine flow channel. Of course, the arrangement of the channels 31c, 32c, 33c, and 34c is not limited to this serpentine shape.

Referring now more specifically to FIG. 3, the reformer 30 according to the present embodiment can be constructed by sequentially stacking the second reaction plate 32a and the third reaction plate 33a on the first reaction plate 31a and stacking the fourth reaction plate 34a under the first reaction plate 31a. The cover plate 36 used as the cover 35 can be coupled to the top surface of the third reaction plate 33a and positioned at an uppermost side of the reformer 30.

That is, between the first reaction plate 31a and the second reaction plate 32a, the first channel 31c of the first reaction plate 31a and a bottom surface of the second reaction plate 32a form a first passage 31d for passing the liquid fuel and the air. Here, an oxidation catalyst layer 31e for promoting the oxidation reaction of the fuel and the air is formed on the entire inner surfaces of the first channel 31c and the whole bottom surface of the second reaction plate 32a.

Therefore, in the present embodiment, the oxidation catalyst layer 31e is formed on the entire surfaces including the cover surface of the first passage 31d. Accordingly, an area in which the liquid fuel and the air passes through in the first passage 31d is enhanced by being in contact with the oxidation catalyst layer 31e on the entire surfaces of the first passage 31d.

Between the second reaction plate 32a and the third reaction plate 33a, the second channel 32c of the second reaction plate 32a and a bottom surface of the third reaction plate 33a form a second passage 32d for passing the fuel. Here, a reforming catalyst layer 32e for promoting the steam reforming reaction of the fuel is formed on the entire inner surfaces of the second channel 32c and the whole bottom surface of the third reaction plate 33a.

Therefore, the reforming catalyst layer 32e is formed on the entire surfaces including the cover surface of the second passage 32d. Accordingly, an area in which the fuel passes through in the second passage 32d is enhanced by being in contact with the reforming catalyst layer 32e on the entire surfaces of the second passage 32d.

Between the third reaction plate 33a and the cover plate 36, the third channel 33c of the third reaction plate 33a and a cover surface of the cover plate 36 form a third passage 33d for passing the hydrogen gas discharged from the second passage 32d. Here, a water-gas shift catalyst layer 33e for promoting the water-gas shift reaction of the hydrogen gas is formed on the entire inner surfaces of the third channel 33c and the whole cover surface of the cover plate 36.

That is, the water-gas shift catalyst layer 33e is formed on the entire surfaces including the cover surface of the third passage 33d. Accordingly, an area in which the hydrogen gas passes through in the third passage 33d is enhanced by being in contact with the water-gas shift catalyst layer 33e on the entire surfaces of the third passage 33d.

Between the fourth reaction plate 34a and the first reaction plate 31a, the fourth channel 34c of the fourth reaction plate 34a and a bottom surface of the first reaction plate 31a form a fourth passage 34d for passing the hydrogen gas discharged from the third passage 33d. Here, a preferential CO oxidation catalyst layer 34e for promoting the preferential CO oxidation reaction of the hydrogen gas is formed on the entire inner surfaces of the fourth channel 34c and the whole bottom surface of the first reaction plate 31a.

Therefore, since the preferential CO oxidation catalyst layer 34e is formed on the entire surfaces including the cover surface of the fourth passage 34d, an area in which the hydrogen gas passes through in the fourth passage 34d comes in contact with the preferential CO oxidation catalyst layer 34e on the entire surfaces of the fourth passage 34d.

The respective catalyst layers 31e, 32e, 33e, and 34e can be formed by first forming the catalyst layers 31e, 32e, 33e, and 34e on the entire inner surfaces of the channels 31c, 32c, 33c, and 34c of the reaction plates 31a, 32a, 33a, and 34a, respectively, forming the same kinds of catalyst layers 31e, 32e, 33e, and 34e on the contact surfaces of the reaction plates 32a, 33a, 36, and 31a, respectively, and bringing the reaction plates 31a, 32a, 33a, and 34a and cover plate 36 into close contact with each other. However, the present invention is not limited to this, and the catalyst layers may be formed using various other methods.

In a reformer according to the present embodiment described above, respective areas in which a fuel or a gas relating to respective reactions that come in contact with the respective catalyst layers (e.g., the respective catalyst layers 31e, 32e, 33e, and 34e) are increased, thereby enhancing the reaction efficiency and the thermal efficiency of the reformer as a whole.

Figure 4:
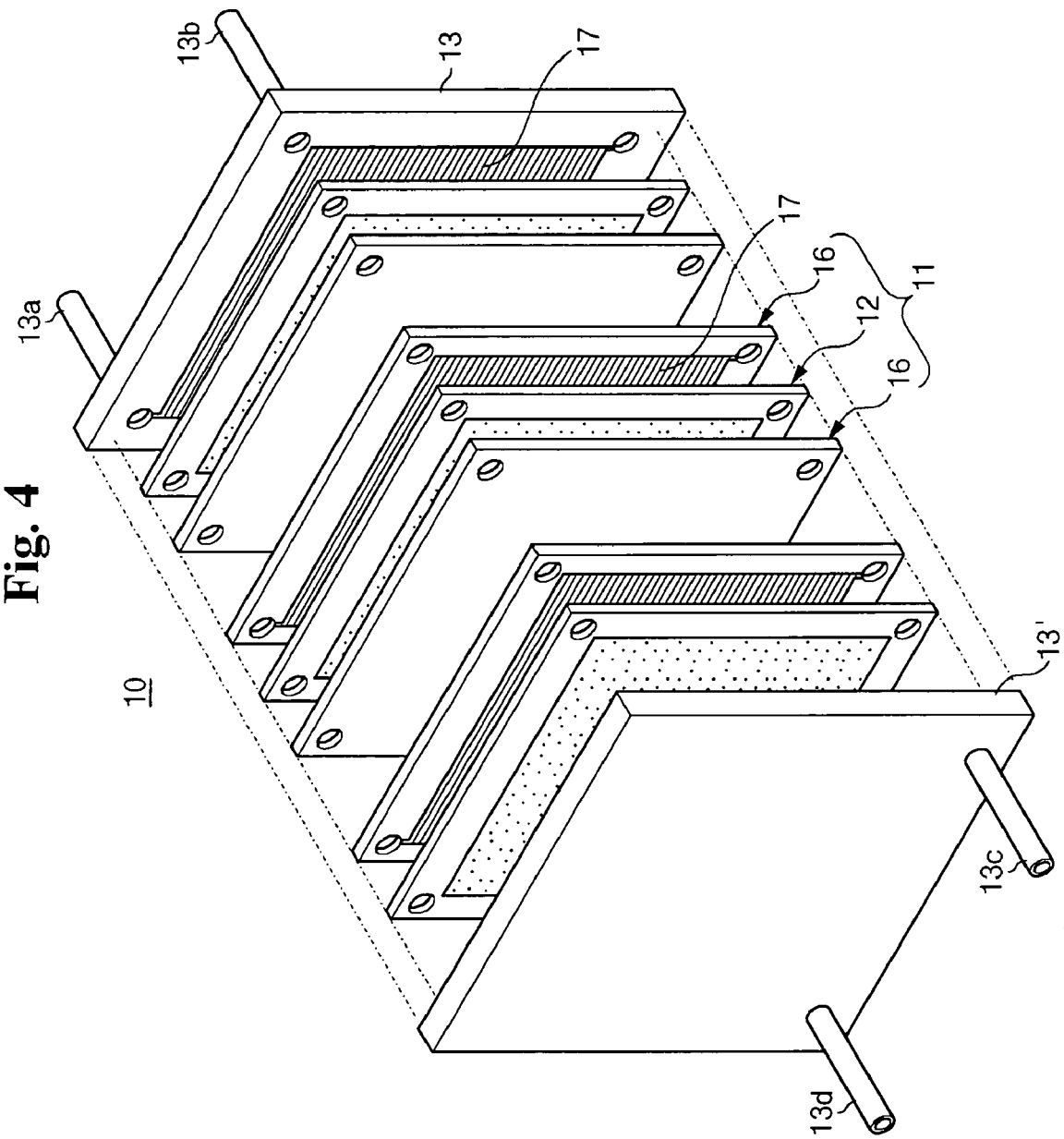
FIG. 4 is an exploded perspective view illustrating a structure of a stack shown in FIG. 1.

FIG. 4 is an exploded perspective view illustrating a structure of the stack shown in FIG. 1.

Referring to FIGS. 1 and 4, the stack 10 of the fuel cell system 100 has electricity generators 11 that are successively stacked and for generating electric energy through the oxidation and reduction reactions of hydrogen generated from the reformer 30 and oxygen contained in the air.

Each of the electricity generators 11 is a unit of a fuel cell for generating electricity in which separators 16 are disposed on both surfaces of a membrane-electrode assembly (MEA) 12.

The MEA 12 has a predetermined active area where the electrochemical reaction of hydrogen and oxygen occurs. The MEA 12 includes an anode electrode formed on one surface, a cathode electrode formed on the other surface, and an electrolyte membrane formed between the anode and cathode electrodes.

The anode electrode converts hydrogen into hydrogen ions (protons) and electrons through an oxidation reaction of the hydrogen. The cathode electrode generates heat and moisture of a predetermined temperature through a reduction reaction of the hydrogen ions and the oxygen. The electrolyte membrane performs an ion exchange function for moving the hydrogen ions generated from the anode electrode to the cathode electrode.

The separators 16 function as conductors for connecting the anode electrode and the cathode electrode in series to each other, and also function as passages for supplying the hydrogen gas and the air necessary for the oxidation and reduction reactions of the MEA 12 to the anode electrode and the cathode electrode.

More specifically, a passage 17 for supplying the hydrogen gas to the anode electrode is formed on the surface of the separator 16 coming in close contact with the anode electrode of the MEA 12, and a passage 17 for supplying the air to the cathode electrode is formed on the surface of the MEA 12 coming in close contact with the cathode electrode.

The outermost sides of the stack 10 may be provided with additional pressing plates 13 and 13' for bringing the electricity generators 11 into close contact with each other. The stack 10 according to the present invention may be constructed such that the separators 16 located at the outermost sides of the plurality of electricity generators 11 carry out the function as the pressing plates 13 and 13', without providing the pressing plates 13 and 13'. The stack 10 may be constructed such that the pressing plates 13 and 13' have a function specific to the separators 16 to be described in more detail later, in addition to the function of bringing the plurality of electricity generators 11 into close contact with each other.

One pressing plate 13 is provided with a first injection hole 13a for supplying the hydrogen gas to the hydrogen passage of the separators 16 and a second injection hole 13b for supplying the air to the air passage of the separators 16. The other pressing plate 13' is provided with a first discharge hole 13c for discharging the non-reacted hydrogen gas in the anode electrode of the MEA 12 and a second discharge hole 13d for discharging the non-reacted air containing the moisture generated through the coupling reaction between hydrogen and oxygen in the cathode electrode of the MEA 12.

The second injection hole 13b and the air pump 71 can be connected through a sixth supply line 86. The first discharge hole 13c can be connected to the inlet 31f of the first reaction plate 31a through an additional pipe (not shown).

Operations of the fuel cell system according to an embodiment of the present invention will be now described in more detail.

First, the fuel pump 55 supplies the fuel stored in the first tank 51 to the first passage 31d of the reformer 30 through the first supply line 81. At the same time, the air pump 71 supplies the air to the first passage 31d through the second supply line 82. Then, while flowing through the first passage 31d, the liquid fuel and the air result in the oxidation catalytic reaction with the oxidation catalyst layer 31e. Accordingly, the heat source 31 generates a reaction heat of a predetermined temperature through the oxidation catalytic reaction of the fuel and the air. As a result, the thermal energy generated from the heat source 31 is delivered to the reforming reactor 32 and the carbon-monoxide reducers 33 and 34 and preheats the entire reformer 30.

Next, when the preheating of the reformer 30 is completed, the fuel pump 55 supplies the fuel stored in the first tank 51 and the water stored in the second tank 53 to the second passage 32d of the reformer 30 through the third supply line 83. Then, the fuel and the water are vaporized with the thermal energy supplied from the heat source 31 while flowing through the second passage 32d. At this time, the reforming reactor 32 generates the hydrogen gas from the vaporized fuel through the steam reforming reaction with the reforming catalyst layer 32e. Since the reforming reactor 32 cannot completely carry out the steam reforming catalytic reaction, the reforming reactor 32 generates the hydrogen gas containing carbon monoxide as a byproduct.

Next, the hydrogen gas containing carbon monoxide flows through the third passage 33d of the reformer 30. Then, the first carbon-monoxide reducer 33 generates additional hydrogen gas through the water-gas shift catalytic reaction with the water-gas shift catalyst layer 33e and primarily reduces the concentration of carbon monoxide contained in the hydrogen gas.

Subsequently, the hydrogen gas passing through the third passage 33d flows through the fourth passage 34d of the reformer 30. At the same time, the air pump 71 supplies the air to the fourth passage 34d through the fourth supply line 84. Then, the second carbon-monoxide reducer 34 further reduces the concentration of carbon monoxide contained in the hydrogen gas through the preferential CO oxidation catalytic reaction with the preferential CO oxidation catalyst layer 34e and discharges the hydrogen gas.

Subsequently, the hydrogen gas is supplied to the first injection hole 13a of the stack 10 through the fifth supply line 85. At the same time, the air pump 71 supplies the air to the second injection hole 13b of the stack 10 through the sixth supply line 86.

Then, the hydrogen gas is supplied to the anode electrode of the MEA 12 through the hydrogen passage of the passages 17 of the separators 16. The air is supplied to the cathode electrode of the MEA 12 through the air passage of the passages 17 of the separators 16.

The anode electrode decomposes the hydrogen gas into electrons and protons (hydrogen ions) through the oxidation reaction. The protons are moved to the cathode electrode through the electrolyte membrane and the electrons are moved to the cathode electrode of the neighboring MEA 12 through the separators 16, and not through the electrolyte membrane. The flow of electrons generates a current, and heat and water are also generated by the stack 10 as byproducts.

Since a fuel cell system according to the present embodiment has a stacked structure of a plurality of reaction plates, the entire fuel cell system can be compact. Accordingly, a manufacturing process can be simplified, thereby further improving the productivity of the fuel cell system.

In a fuel cell system according to the present invention, it is possible to rapidly deliver thermal energy necessary for various reactions of a fuel. Therefore, it is possible to enhance a reaction efficiency and a thermal efficiency of an entire reformer of the fuel cell system.

Modified examples of the first embodiment will be described below. In the modified examples, elements that are substantially the same as those described for the first embodiment will not be described again. Like elements are denoted by like reference numerals in the drawings.

Figure 5:
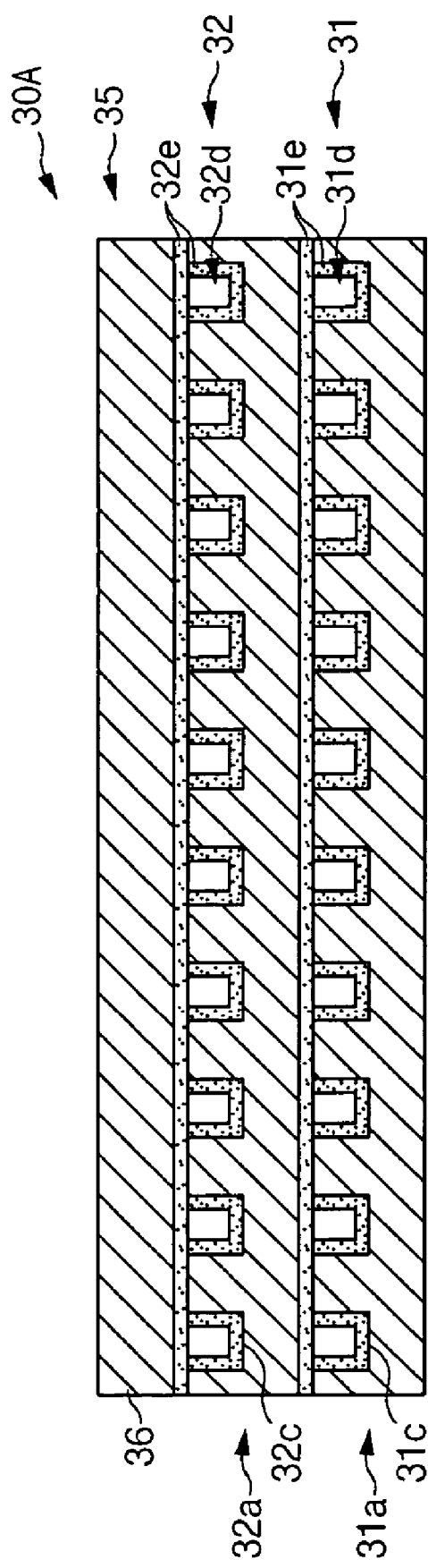
FIG. 5 is a cross-sectional view illustrating a first modified example of the reformer according to the embodiment of the present invention.

FIG. 5 is a cross-sectional view illustrating a first modified example of the reformer according to the embodiment of the present invention.

Referring to FIG. 5, the reformer 30A according to the present modified example is formed by sequentially stacking the reforming reactor 32 and the cover 35 on the heat source 31.

Specifically, the reformer 30A has a structure such that the second reaction plate 32a is stacked on the first reaction plate 31a and the cover plate 36 is stacked on the second reaction plate 32a. Between the first reaction plate 31a and the second reaction plate 32a, the first channel 31c of the first reaction plate 31a and the bottom surface of the second reaction plate 32a form the first passage 31d. Here, the oxidation catalyst layer 31e is formed on the entire inner surfaces of the first channel 31c and the bottom surface of the second reaction plate 32a. As a result, the oxidation catalyst layer 31e is formed on the entire surfaces including the cover surface of the first passage 31d.

Between the second reaction plate 32a and the cover plate 36, the second channel 32c of the second reaction plate 32a and the bottom surface of the cover plate 36 form the second passage 32d. Here, the reforming catalyst layer 32e is formed on the entire inner surfaces of the second channel 32c and the bottom surface of the cover plate 36. As a result, the reforming catalyst layer 32e is formed on the entire surfaces including the cover surface of the second passage 32d.

Figure 6:
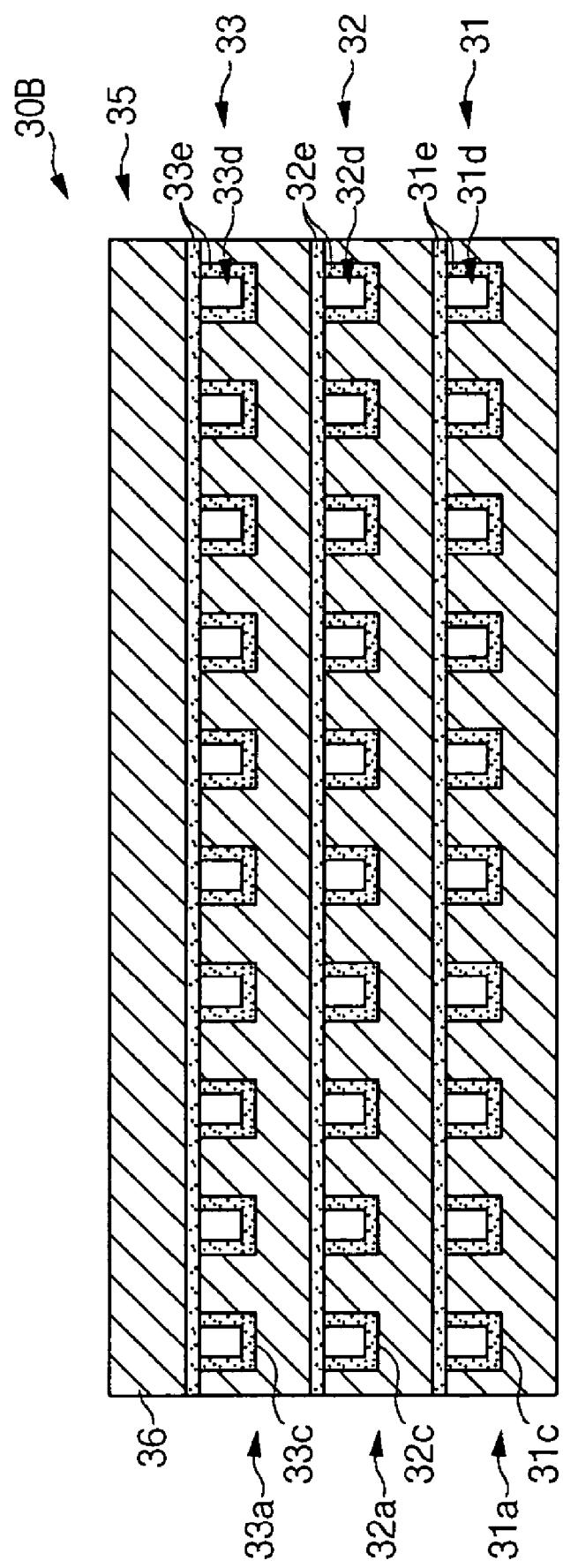
FIG. 6 is a cross-sectional view illustrating a second modified example of the reformer according to the embodiment of the present invention.

FIG. 6 is a cross-sectional view illustrating a second modified example of the reformer according to the embodiment of the present invention.

Referring to FIG. 6, the reformer 30B according to the present modified example has a structure such that the reforming reactor 32, the first carbon-monoxide reducer 33, and the cover 35 are sequentially stacked on the heat source 31.

Figure 7:
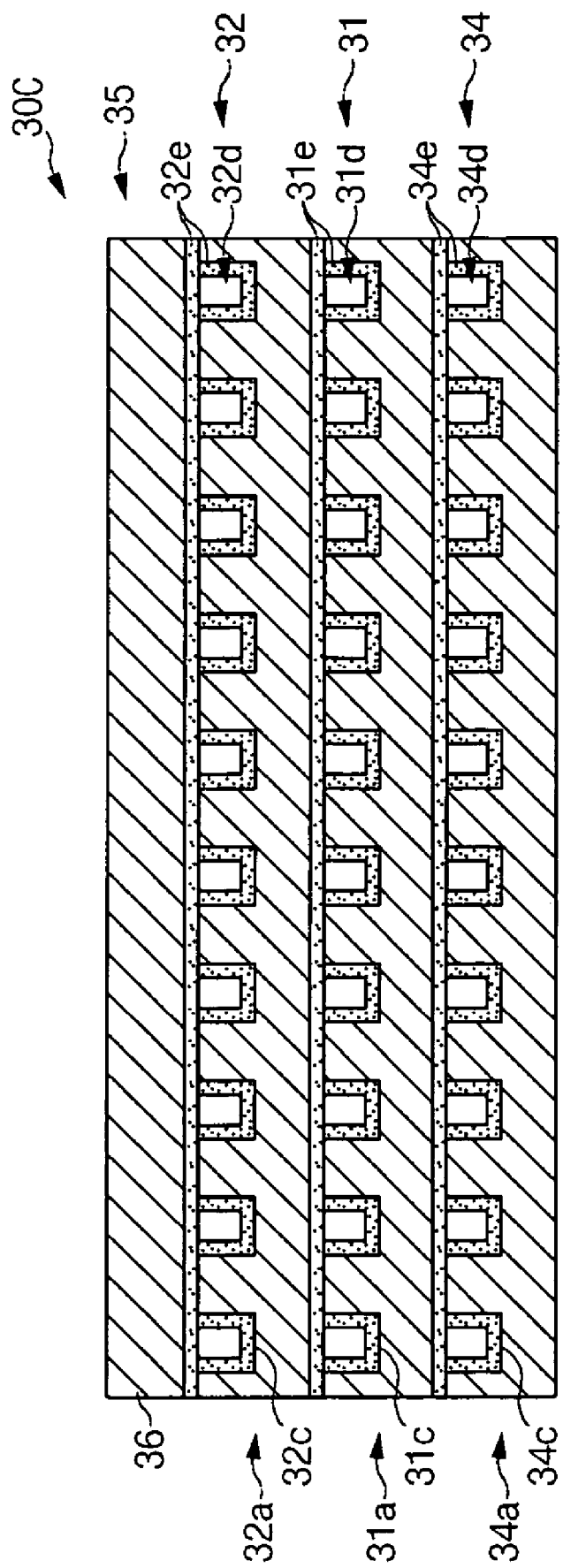
FIG. 7 is a cross-sectional view illustrating a third modified example of the reformer according to the embodiment of the present invention.

FIG. 7 is a cross-sectional view illustrating a third modified example of the reformer according to the embodiment of the present invention.

Referring to FIG. 7, the reformer 30C according to the present modified example has a structure such that the reforming reactor 32 and the cover 35 are sequentially stacked on the heat source 31 and the second carbon-monoxide reducer 34 is stacked under the heat source 31. In contrast to the reformer 30 of FIG. 3, the reformer 30C does not include the first carbon-monoxide reducer 33.

Figure 8:
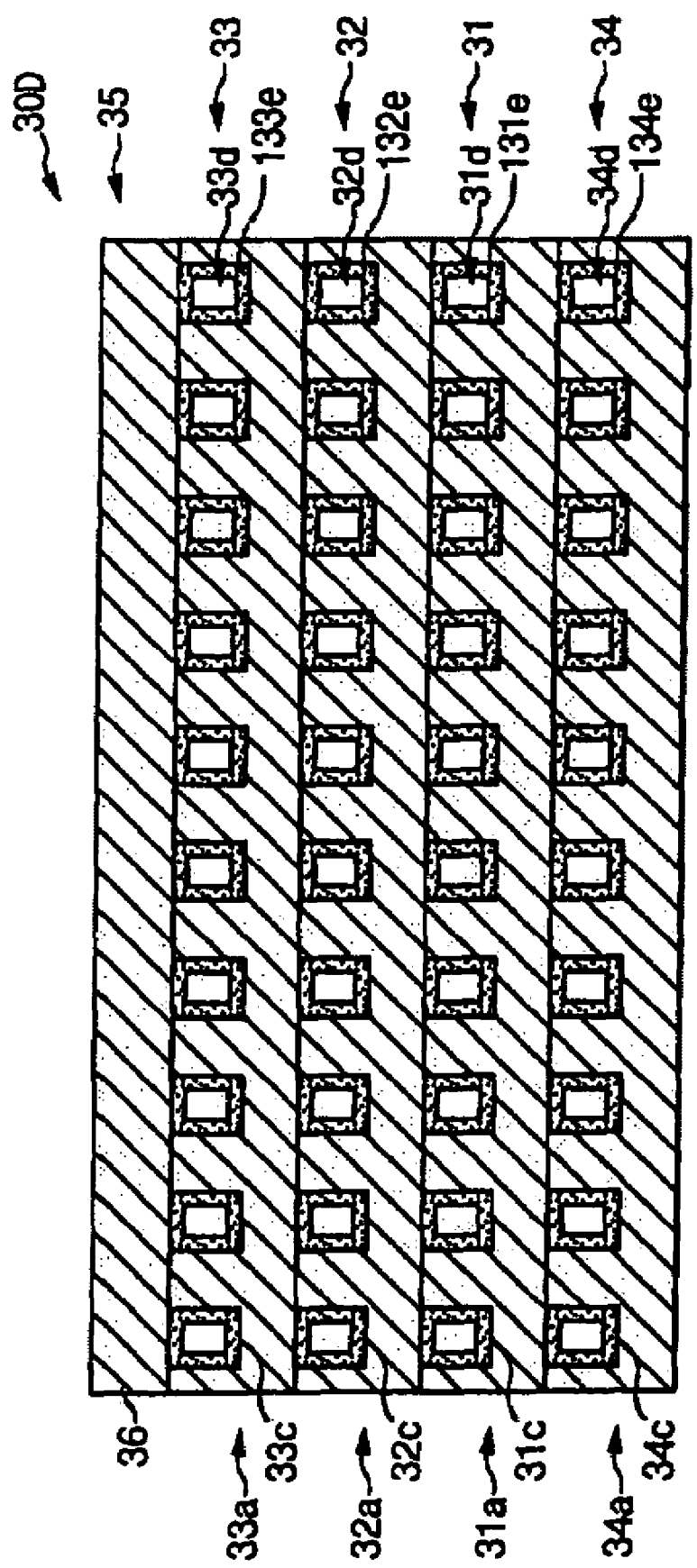
FIG. 8 is a cross-sectional view illustrating a fourth modified example of the reformer according to the embodiment of the present invention.

FIG. 8 is a cross-sectional view illustrating a fourth modified example of the reformer according to the embodiment of the present invention.

Referring to FIG. 8, the reformer 30D according to the present modified example has catalyst layers 131e, 132e, 133e, and 134e that are respectively formed only on the surfaces constituting the respective passages 31d, 32d, 33d, and 34d. That is, the catalyst layers 131e, 132e, 133e, and 134e are formed only on the entire inner surfaces of the channels 31c, 32c, 33c, and 34c formed in the reaction plates 31a, 32a, 33a, and 34a and on portions of the contact surfaces of different reaction plates contacting the channels 31c, 32c, 33c, and 34c, where the portions of the contact surfaces correspond to the channels 31c, 32c, 33c, and 34c.

Such a type of catalyst layers 131e, 132e, 133e, and 134e can be formed by first forming the catalyst layers 131e, 132e, 133e, and 134e on the entire inner surfaces of the channels 31c, 32c, 33c, and 34c of the reaction plates 31a, 32a, 33a, and 34a, respectively, then forming the same types of catalyst layers 131e, 132e, 133e, and 134e on the portions of the reaction plates 32a, 33a, 36, and 31a corresponding to the channels 31c, 32c, 33c, and 34c, respectively, and then bringing the reaction plates 31a, 32a, 33a, and 34a into close contact with each other. Alternatively, the catalyst layers 131e, 132e, 133e, and 134e can be formed after bringing the reaction plates 31a, 32a, 33a, and 34a and the different plates 32a, 33a, 36, and 31a into close contact with each other. However, the present invention is not limited to this, and the catalyst layers 131e, 132e, 133e, and 134e may be formed using other suitable methods known to those skilled in the art.

Figure 9:
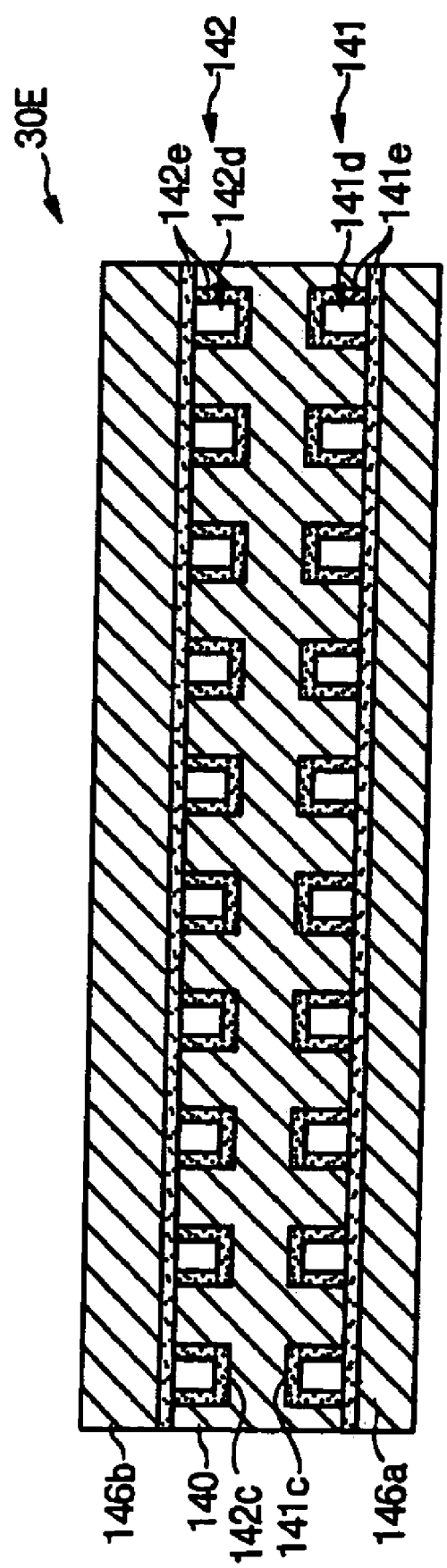
FIG. 9 is a cross-sectional view illustrating a fifth modified example of the reformer according to the embodiment of the present invention.

FIG. 9 is a cross-sectional view illustrating a fifth modified example of the reformer according to the embodiment of the present invention.

Referring to FIG. 9, the reformer 30E according to the present modified example has a structure such that channels 141c and 142c are formed on both top and bottom surfaces of one reaction plate 140, cover plates 146a and 146b come in close contact with both the top and bottom surfaces in which the channels 141c and 142c are located on an oxidation catalyst layer 141e, and a reforming catalyst layer 142e is formed on the entire surfaces of passages 141d and 142d respectively formed by the channels 141c and 142c and the cover plates 146a and 146b, thereby forming a heat source 141 and a reforming reactor 142.

Although it has been described and shown in the present fifth modified example that a reaction plate of which both top and bottom surfaces are provided with channels that are disposed between two cover plates, the present invention is not limited to this, and a reformer may be formed into a variety of suitable structures by stacking various types of suitable plates.

While the present invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A fuel cell system comprising:
a reformer adapted to generate hydrogen from a fuel containing hydrogen;
at least one electricity generator adapted to generate electric energy through an electrochemical reaction between hydrogen and oxygen;
a fuel supply unit adapted to supply the fuel to the reformer; and
an oxygen supply unit adapted to supply oxygen to the reformer and the electricity generator,
wherein the reformer includes a plurality of plates stacked together as a stack, the stack having at least one serpentine passage comprising a plurality of flow lines, adjacent flow lines of the plurality of flow lines being connected at their ends, the at least one serpentine passage being adapted to allow a material selected from the group consisting of the fuel and a gas to flow therethrough,
wherein the plurality of plates comprises:
a first plate comprising an outer surface having a serpentine channel formed therein, and a catalyst in the serpentine channel; and
a second plate adjacent the first plate and comprising a surface including a passage portion corresponding to a portion of the outer surface of the first plate having the serpentine channel formed therein and a non-passage portion corresponding to a remaining portion of the outer surface of the first plate, the second plate comprising the catalyst on the passage portion of the surface,
wherein the non-passage portion of the surface of the second plate contacts the outer surface of the first plate, and both the passage portion and the non-passage portion of the surface of the second plate are substantially parallel to the outer surface of the first plate,
wherein a first serpentine passage of the at least one serpentine passage is defined by at least one inner surface of the serpentine channel of the first plate and the passage portion of the surface of the second plate, and
wherein the catalyst is on the entire at least one inner surface of the serpentine channel and on the entire surface of the second plate.

2. The fuel cell system of claim 1, wherein the fuel supply unit comprises:
a fuel tank adapted to store the hydrogen-containing fuel, and
a fuel pump connected to the fuel tank.

3. The fuel cell system of claim 1, wherein the oxygen supply unit comprises an air pump adapted to pump air.

4. The fuel cell system of claim 1, wherein the fuel cell system employs a polymer electrolyte membrane fuel cell scheme.

5. The fuel cell system of claim 1, wherein the reformer comprises a heat source adapted to generate thermal energy and a reforming reactor adapted to generate hydrogen from the fuel and stacked with the heat source.

6. A fuel cell system comprising:
a reformer comprising a heat source adapted to generate thermal energy and a reforming reactor adapted to generate hydrogen from a fuel containing hydrogen and stacked with the heat source;
at least one electricity generator adapted to generate electric energy through an electrochemical reaction between hydrogen and oxygen;
a fuel supply unit adapted to supply the fuel to the reformer; and
an oxygen supply unit adapted to supply oxygen to the reformer and the electricity generator,
wherein the reformer includes a plurality of plates stacked together as a stack, the stack having at least one serpentine passage comprising a plurality of flow lines, adjacent flow lines of the plurality of flow lines being connected at their ends, the at least one serpentine passage being adapted to allow a material selected from the group consisting of the fuel and a gas to flow therethrough,
wherein the plurality of plates includes:
a first plate comprising an outer surface having a first channel formed therein, and an oxidation catalyst in the first channel,
a second plate adjacent the first plate and comprising a first surface including a passage portion corresponding to a portion of the outer surface of the first plate having the first channel formed therein and a non-passage portion corresponding to a remaining portion of the outer surface of the first plate, and a second surface opposite the first surface and having a second channel formed therein, the second plate comprising the oxidation catalyst on the passage portion of the first surface and a reforming catalyst in the second channel; and
a third plate adjacent the second plate and comprising a surface including a passage portion corresponding to a portion of the second surface of the second plate having the second channel formed therein and a non-passage portion corresponding to a remaining portion of the second surface of the second plate, the third plate comprising the reforming catalyst on the passage portion of the surface, and
wherein the non-passage portion of the first surface of the second plate contacts the outer surface of the first plate, and the non-passage portion of the surface of the third plate contacts the second surface of the second plate
wherein a first serpentine passage of the at least one serpentine passage is defined by at least one inner surface of the first channel and the passage portion of the first surface of the second plate, and a second serpentine passage of the at least one serpentine passage is defined by at least one inner surface of the second channel and the passage portion of the surface of the third plate, and
wherein the catalyst on the first surface of the second plate is on the entire first surface of the second plate or the catalyst on the second surface of the second plate is on the entire second surface of the second plate.

7. The fuel cell system of claim 6, wherein the reformer further comprises at least one carbon-monoxide reducer adapted to reduce a concentration of carbon monoxide contained in a hydrogen gas and stacked with the heat source and the reforming reactor.

8. The fuel cell system of claim 7, wherein the third plate further comprises another surface opposite the surface including the passage portion and the non-passage portion, the another surface having a third channel formed therein, the third plate comprising a water-gas shift catalyst in the third channel,
wherein the plurality of plates further includes a fourth plate adjacent the third plate and comprising a surface including a passage portion corresponding to a portion of the another surface of the third plate having the third channel formed therein and a non-passage portion corresponding to a remaining portion of the another surface of the third plate, the fourth plate comprising the water-gas shift catalyst on the passage portion of the surface,
wherein the non-passage portion of the surface of the fourth plate contacts the another surface of the third plate, and
wherein a third serpentine passage of the at least one serpentine passage is defined by at least one inner surface of the third channel and the passage portion of the surface of the fourth plate.

9. The fuel cell system of claim 8, wherein the plurality of plates further includes a fifth plate adjacent the first plate and comprising an outer surface having a fourth channel formed therein, and a preferential CO oxidation catalyst in the fourth channel,
wherein the first plate further comprises another surface opposite the outer surface having the first channel formed therein, the another surface including a passage portion corresponding to a portion of the outer surface of the fifth plate having the fourth channel formed therein and a non-passage portion corresponding to a remaining portion of the outer surface of the fifth plate, the first plate comprising the preferential CO oxidation catalyst on the passage portion of the another surface,
wherein the non-passage portion of the another surface of the first plate contacts the outer surface of the fifth plate, and
wherein a fourth serpentine passage of the at least one serpentine passage is defined by at least one inner surface of the fourth channel and the passage portion of the another surface of the first plate.

10. The fuel cell system of claim 7, wherein the plurality of plates further includes a fourth plate adjacent the first plate and comprising an outer surface having a third channel formed therein, and a preferential CO oxidation catalyst in the third channel,
wherein the first plate further comprises another surface opposite the outer surface having the first channel formed therein, the another surface including a passage portion corresponding to a portion of the outer surface of the fourth plate having the third channel formed therein and a non-passage portion corresponding to a remaining portion of the outer surface of the fourth plate, the first plate comprising the preferential CO oxidation catalyst on the passage portion of the another surface,
wherein the non-passage portion of the another surface of the first plate contacts the outer surface of the fourth plate, and
wherein a third serpentine passage of the at least one serpentine passage is defined by at least one inner surface of the third channel and the passage portion of the another surface of the first plate.

11. A reformer of a fuel cell system comprising a plurality of plates stacked together as a stack, the stack having at least one serpentine passage adapted to allow a material selected from the group consisting of a fuel and a gas to flow therethrough and having an inlet at a start end of the at least one serpentine passage and an outlet at a finish end of the at least one serpentine passage,
wherein the plurality of plates comprises:
a first plate comprising an outer surface having a serpentine channel formed therein, and a catalyst in the serpentine channel; and
a second plate adjacent the first plate and comprising a surface including a passage portion corresponding to a portion of the outer surface of the first plate having the serpentine channel formed therein and a non-passage portion corresponding to a remaining portion of the outer surface of the first plate, the second plate comprising the catalyst on the passage portion of the surface,
wherein the non-passage portion of the surface of the second plate contacts the outer surface of the first plate, and both the passage portion and the non-passage portion of the surface of the second plate are substantially parallel to the outer surface of the first plate,
wherein a first serpentine passage of the at least one serpentine passage is defined by at least one inner surface of the serpentine channel of the first plate and the passage portion of the surface of the second plate, and
wherein the catalyst is on the entire at least one inner surface of the serpentine channel and on the entire surface of the second plate.

12. The reformer of claim 11, wherein the reformer comprises a heat source adapted to generate thermal energy and a reforming reactor adapted to generate hydrogen from the fuel and stacked with the heat source.

13. A reformer of a fuel cell system comprising:
a heat source adapted to generate thermal energy;
a reforming reactor adapted to generate hydrogen from the fuel and stacked with the heat source; and
a plurality of plates stacked together as a stack, the stack having at least one serpentine passage adapted to allow a material selected from the group consisting of a fuel and a gas to flow therethrough and having an inlet at a start end of the at least one serpentine passage and an outlet at a finish end of the at least one serpentine passage,
wherein the plurality of plates includes:
a first plate comprising an outer surface having a first channel formed therein, and an oxidation catalyst in the first channel;
a second plate adjacent the first plate and comprising a first surface including a passage portion corresponding to a portion of the outer surface of the first plate having the first channel formed therein and a non-passage portion corresponding to a remaining portion of the outer surface of the first plate, and a second surface opposite the first surface and having a second channel formed therein, the second plate comprising the oxidation catalyst on the passage portion of the first surface and a reforming catalyst in the second channel;
a third plate adjacent the second plate and comprising a surface including a passage portion corresponding to a portion of the second surface of the second plate having the second channel formed therein and a non-passage portion corresponding to a remaining portion of the second surface of the second plate, the third plate comprising the reforming catalyst on the passage portion of the surface,
wherein the non-passage portion of the first surface of the second plate contacts the outer surface of the first plate, and the non-passage portion of the surface of the third plate contacts the second surface of the second plate, and wherein a first serpentine passage of the at least one serpentine passage is defined by at least one inner surface of the first channel and the passage portion of the first surface of the second plate, and a second serpentine passage of the at least one serpentine passage is defined by at least one inner surface of the second channel and the passage portion of the surface of the third plate, and wherein the catalyst on the first surface of the second plate is on the entire first surface of the second plate or the catalyst on the second surface of the second plate is on the entire second surface of the second plate.

14. The reformer of claim 13, wherein the reformer further comprises at least one carbon-monoxide reducer adapted to reduce a concentration of carbon monoxide contained in a hydrogen gas and stacked with the heat source and the reforming reactor.

15. The reformer of claim 14, wherein the third plate further comprises another surface opposite the surface including the passage portion and the non-passage portion, the another surface having a third channel formed therein, the third plate comprising a water-gas shift catalyst in the third channel, wherein the plurality of plates further includes a fourth plate adjacent the third plate and comprising a surface including a passage portion corresponding to a portion of the another surface of the third plate having the third channel formed therein and a non-passage portion corresponding to a remaining portion of the another surface of the third plate, the fourth plate comprising the water-gas shift catalyst on the passage portion of the surface, wherein the non-passage portion of the surface of the fourth plate contacts the another surface of the third plate, and wherein a third serpentine passage of the at least one serpentine passage is defined by at least one inner surface of the third channel and the passage portion of the surface of the fourth plate.

16. The reformer of claim 15, wherein the plurality of plates further includes a fifth plate adjacent the first plate and comprising an outer surface having a fourth channel formed therein, and a preferential CO oxidation catalyst in the fourth channel, wherein the first plate further comprises another surface opposite the outer surface having the first channel formed therein, the another surface including a passage portion corresponding to a portion of the outer surface of the fifth plate having the fourth channel formed therein and a non-passage portion corresponding to a remaining portion of the outer surface of the fifth plate, the first plate comprising the preferential CO oxidation catalyst on the passage portion of the another surface, wherein the non-passage portion of the another surface of the first plate contacts the outer surface of the fifth plate, and wherein a fourth serpentine passage of the at least one serpentine passage is defined by at least one inner surface of the fourth channel and the passage portion of the another surface of the first plate.

17. The reformer of claim 14, wherein the plurality of plates further includes a fourth plate adjacent the first plate and comprising an outer surface having a third channel formed therein, and a preferential CO oxidation catalyst in the third channel, wherein the first plate further comprises another surface opposite the outer surface having the first channel formed therein, the another surface including a passage portion corresponding to a portion of the outer surface of the fourth plate having the third channel formed therein and a non-passage portion corresponding to a remaining portion of the outer surface of the fourth plate, the first plate comprising the preferential CO oxidation catalyst on the passage portion of the another surface, wherein the non-passage portion of the another surface of the first plate contacts the outer surface of the fourth plate, and wherein a third serpentine passage of the at least one serpentine passage is defined by at least one inner surface of the third channel and the passage portion of the another surface of the first plate.

18. A reformer of a fuel cell system comprising a plurality of plates stacked with each other, the plurality of plates forming at least a reforming reactor including a serpentine reaction passage of the reforming reactor;

wherein the plurality of plates comprises:
a first plate comprising an outer surface having a serpentine channel formed therein, and a catalyst in the serpentine channel; and
a second plate adjacent the first plate and comprising a surface including a passage portion corresponding to a portion of the outer surface of the first plate having the serpentine channel formed therein and a non-passage portion corresponding to a remaining portion of the outer surface of the first plate, the second plate comprising the catalyst on the passage portion of the surface, wherein the non-passage portion of the surface of the second plate contacts the outer surface of the first plate, and both the passage portion and the non-passage portion of the surface of the second plate are substantially parallel to the outer surface of the first plate, wherein the serpentine reaction passage is defined by at least one inner surface of the serpentine channel of the first plate and the passage portion of the surface of the second plate, wherein the catalyst is on the entire at least one inner surface of the serpentine channel and on the entire surface of the second plate, wherein the catalyst comprises a reforming catalyst, wherein the serpentine reaction passage has an inlet at a start end of the serpentine reaction passage and an outlet at a finish end of the serpentine reaction passage, and wherein the serpentine reaction passage is configured to flow a fuel comprising hydrogen into the inlet at the start end of the serpentine reaction passage for reforming with the reforming catalyst, and to flow the reformed fuel out of the outlet at the finish end of the serpentine reaction passage.

* * * * *